Nov. 4, 1958    J. H. BAILEY    2,858,818

ENGINE VALVE OPERATING CAM

Filed Nov. 7, 1957

Inventor

JOSEPH H. BAILEY

By RICHEY, WATTS, EDGERTON,
McNENNY & FARRINGTON
    AH Edgerton    Attorneys

United States Patent Office 2,858,818
Patented Nov. 4, 1958

2,858,818
ENGINE VALVE OPERATING CAM
Joseph H. Bailey, Cleveland, Ohio

Application November 7, 1957, Serial No. 694,977

5 Claims. (Cl. 123—90)

This invention relates broadly to internal combustion engines, and more specifically to improvements in the valve operating cams therefor.

One of the objects of the invention is to provide a face cam whose distinctive feature is that the follower is given a positive motion in both directions instead of relying upon a spring or the action of gravity to return the follower.

Another object of the invention is to provide means for the vertical adjustment of the valve and a locking mechanism for the positive retention thereof.

A further object of the invention is to provide a guide bushing which is relatively long and of a diameter susceptible of restraining lateral strains.

Another object of the invention is to provide a roller in the follower yoke engaged with the periphery of the cam to minimize the strains imposed on the face groove at the point therein where the direction of movement is reversed.

Other objects and advantages more or less ancillary to the foregoing, and the manner in which all the various objects are realized, will appear in the following description, which considered in connection with the accompanying drawings, sets forth the preferred embodiment of the invention.

Figure 1:
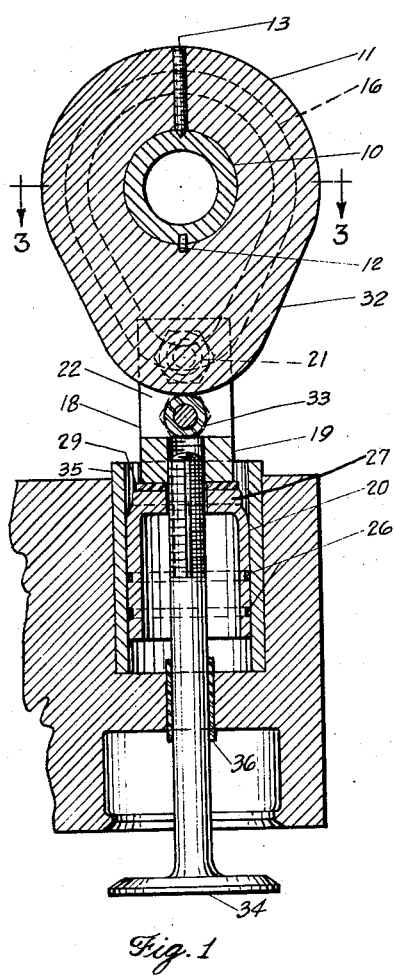
Fig. 1 is a vertical sectional view of a fragmentary portion of a cam shaft, valve and valve cage of an engine embodying the improved cams.
Figure 2:
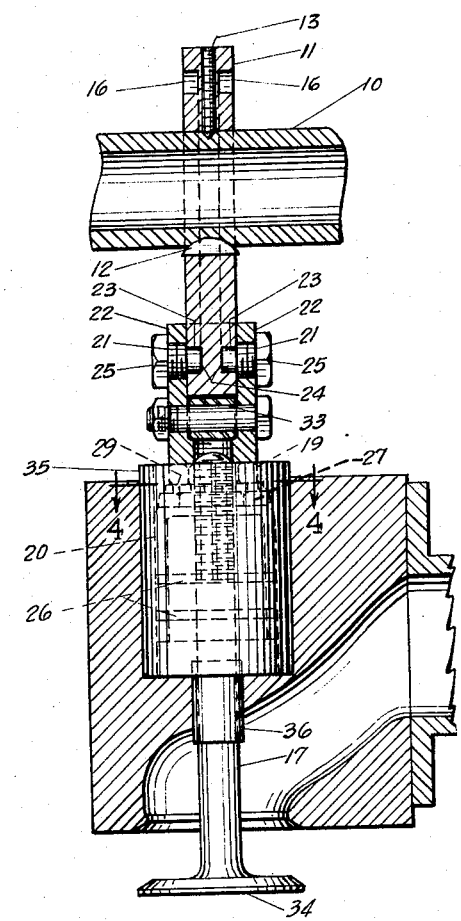
Fig. 2 is a similar sectional view taken at right angles to the section of Fig. 1.
Figure 3:
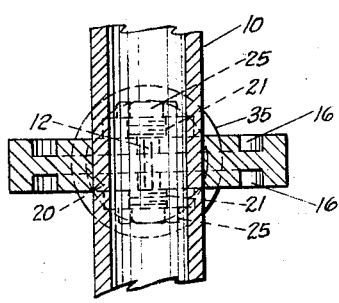
Fig. 3 is a transverse sectional view through one of the cams, the section being taken on a plane indicated by the line 3—3 in Fig. 1.
Figure 4:
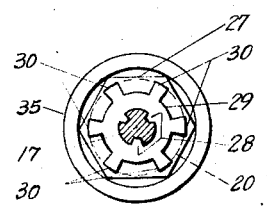
Fig. 4 is a transverse sectional view below the base of the follower, illustrating the form of the lockwasher for retaining the valve in its adjusted position.

Referring first to Fig. 1, the cam shaft 10 is preferably formed from a tube or a bar drilled throughout its length to facilitate the circulation of lubricant to the bearings and face cams mounted thereon. The shaft is supported in bearings (not shown), and is rotatively driven by gearing in the conventional manner. The cams 11 are locked upon the shaft by Woodruff keys 12, and are further held in position by set screws 13 threaded in the portion of the cams opposite the lift thereof. The opposed side walls of each cam is formed with grooves 16 therein which are configured to effect the requisite lift of the valve 17. A follower yoke 18 is provided with a hexagonal nut 19 in the base thereof and is united with a cylindrical cup 20 by the engagement of the threaded stem of the valve 17 in the follower 18 and cup 20. The upper end of the yoke 18 supports a pair of pins 21 which are threaded in the tines 22 of the yoke with the ends 23 thereof engaged in the grooves 16. The pins are hardened and ground, and the face 24 of the ends 23 thereof are machined for running clearance with the lapped side walls of the groove. The outer ends of the pins are formed with hexagonal heads 25 adjacent the outer ends of the threaded portions thereof to facilitate the retention of the pins when seated in place. The lower end of the cup 20 is tubular and formed with oil rings 26 therein. The upper end of the cup is provided with a hexagonal boss 27 which is drilled and tapped for the reception of the threaded end of the stem of the valve 17. The valve stem is splined for engagement with tongues 28 in a lock washer 29 provided to retain the valve in its vertically adjusted position. The lockwasher may be formed with flat side walls for a spanner wrench or drilled with spaced openings for a pin wrench, or formed with lugs 30, as shown in Fig. 4, for the reception of a hooked spanner wrench. In adjusting the valve, the follower yoke 18 is held against rotation by a wrench engaged with nut 19, then the hexagonal nut 27 on the top of the cup 20 is loosened and the valve is rotated by adjustment of the lockwasher 29 until the desired clearance is attained between the periphery of the cam and a roller in the follower yoke 18, thereafter, the hexagonal nut 27 is rotated to lock the valve stem into fixed position with the lockwasher 29.

The peripheral face 32 of the cam is ground in similar configuration to the form of the grooves 16 and a roller 33 is rotatively mounted between the tines 22 of the follower yoke 18 upon a bolt or pin disposed superjacent the base thereof and engaged with said cam face.

In operation, the ends 23 of the pins 21 follow the grooves 16 and alternately elevate and lower the follower yoke 18 and the valve 17 held thereby. It will be noted that the movement of the valve is positive, and since the springs that are customarily used to seat the valves are eliminated, appreciable conservation of power is attained and positive closure of the valve head 34 with its seat is assured. The continuous face cam also eliminates vibration, such as valve bouncing, when the valve is open at high engine speeds. The large diameter of the follower and the bushing 35 therefor assures free reciprocative movement of the follower, and a secondary bushing 36 in the cylinder head maintains the concentric alignment of the valve upon its seat.

It will be understood that both the intake and exhaust valves may be controlled by cams and their appurtenances of the character heretofore described, and that the interval of movement thereof is merely a matter of the position of the cams upon the cam shaft.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or the spirit of the invention as herein claimed.

What is claimed is:

1. A cam and cam follower for an internal combustion engine comprising a cam shaft, face cams mounted thereon, each of said face cams having grooves in the opposed side walls thereof, follower yokes straddling said cams, screws threaded in the follower yoke with unthreaded screw ends thereon seated in said cam grooves, a splined valve stem threaded in said follower, a valve head on said stem, a valve seat therefor in the engine, a nut on the top of said follower, and a lock washer keyed to said splines on said valve stem for the retention thereof, said valve being vertically adjusted by loosening the follower, rotating the valve then tightening said lock washer against said nut.

2. A cam and cam follower for an internal combustion engine comprising a cam shaft, face cams mounted thereon, each of said face cams having grooves in the opposed side walls thereof, follower yokes subjacent said cams, pins screw threaded in the follower yoke with the inner ends thereof engaged in said groove, a cup subjacent said follower, a valve stem threaded in said follower, a nut on the top of said follower, a valve head on said valve stem, a valve seat therefor in the engine, said valve stem having splined grooves therein, a lock washer on said valve stem, tongues in said lock washer engaged with said grooves in said valve stem, whereby said nut on said follower may be held and said valve stem rotated to adjusted position, then the lock washer rotated on the valve stem into impinged relation with said nut on said follower.

3. A cam and cam follower for an internal combustion engine comprising a cam shaft, face cams mounted thereon, each of said face cams having grooves in the opposed side walls thereof, follower yokes subjacent said cams, pins screw threaded in the follower yoke with the inner ends thereof engaged in said grooves, a cup subjacent said follower, a valve stem threaded in said follower and said cup, a nut on the head of said follower, a valve head on said valve stem, a valve seat therefor in the engine, a roller in said follower yoke engaged with the peripherical face of said cam, and a lock washer keyed to said valve stem, said valve being adjusted by holding the nut on the top of the follower, rotating said valve stem, then seating said lock washer upon said nut.

4. A cam and cam follower for an internal combustion engine comprising a cam shaft, face cams mounted thereon, each of said face cams having grooves in the opposed side walls thereof, a follower yoke subjacent said cams, threaded pins screwed in the follower yoke with the ends engaged in said groove, a cylindrical cup subjacent said follower yoke, a valve stem threaded in said follower, a nut on the top of said follower, a valve head on said valve stem, a valve seat in the engine for said valve head, a guide bushing on said valve stem, and a lock washer keyed to said valve stem for the retention thereof after vertical adjustment thereof.

5. A cam and cam follower for an internal combustion engine comprising a cam shaft, face cams mounted thereon, each of said face cams having grooves in the opposed side walls thereof, a follower yoke subjacent said cams, a cup subjacent said follower, a nut on the bottom of said follower, pintles screw threaded in said follower yoke having the inner ends thereof in said grooves, a poppet valve threaded for vertical adjustment in said follower yoke, and a lock washer keyed to said valve stem and disposed in impinged relation with the nut on said follower when said valve is vertically adjusted.

References Cited in the file of this patent

UNITED STATES PATENTS

| 1,238,175 | Moore | Aug. 28, 1917 |
| 1,326,208 | Medanich | Dec. 30, 1919 |
| 2,169,773 | Slater et al. | Aug. 15, 1939 |

FOREIGN PATENTS

| 434,247 | Great Britain | Aug. 28, 1935 |
| 516,746 | Great Britain | Jan. 10, 1940 |